United States Patent [19]

Lancaster

[11] Patent Number: 5,269,443
[45] Date of Patent: Dec. 14, 1993

[54] DOSING PUMP FOR BLENDING TWO LIQUIDS

[75] Inventor: Arthur Lancaster, Costa Mesa, Calif.

[73] Assignee: Condor, Inc., Yorba Linda, Calif.

[21] Appl. No.: 971,520

[22] Filed: Nov. 3, 1992

[51] Int. Cl.⁵ .............................................. B65D 37/00
[52] U.S. Cl. .................................... 222/207; 222/214; 417/46
[58] Field of Search .................. 222/81, 129.2, 133, 222/325, 334, 207, 214, 1, 135; 137/99; 433/80; 417/46, 348, 476

[56] References Cited

U.S. PATENT DOCUMENTS

| | | | |
|---|---|---|---|
| 30,536 | 3/1981 | Perdreaux, Jr. | 433/86 |
| 3,323,681 | 6/1967 | Di Vette et al. | 222/133 |
| 3,575,535 | 4/1971 | Bickar | 137/99 |
| 3,642,171 | 2/1972 | Ernst | 222/133 |
| 3,750,908 | 8/1973 | Bauerlein et al. | 222/214 |
| 3,956,826 | 5/1976 | Perdreaux, Jr. | 32/58 |
| 4,274,409 | 6/1981 | Bush | 417/476 |

OTHER PUBLICATIONS

Page from Flow Data Inc. Catalog (no date).

*Primary Examiner*—Andres Kashnikow
*Assistant Examiner*—Philippe Derakshani
*Attorney, Agent, or Firm*—John L. Rogitz

[57] ABSTRACT

A dosing system for precisely mixing two liquids in a predetermined volumetric relationship includes a flow meter having a fluid inlet, a fluid outlet, and two intermeshed counter-rotating gears positioned between the inlet and outlet. When a first fluid is directed from the inlet to the outlet, the first fluid causes the gears to turn, and the gears turn a predetermined amount for each unit of first fluid directed through the flow meter. The rotor of a peristaltic pump is coupled to one of the gears of the flow meter, such that for each increment of rotation of the gear, the rotor turns to pump a predetermined amount of a second fluid through the peristaltic pump. The outlets of the two pumps are in fluid communication, to permit mixing of the predetermined amounts of first and second fluid.

18 Claims, 3 Drawing Sheets

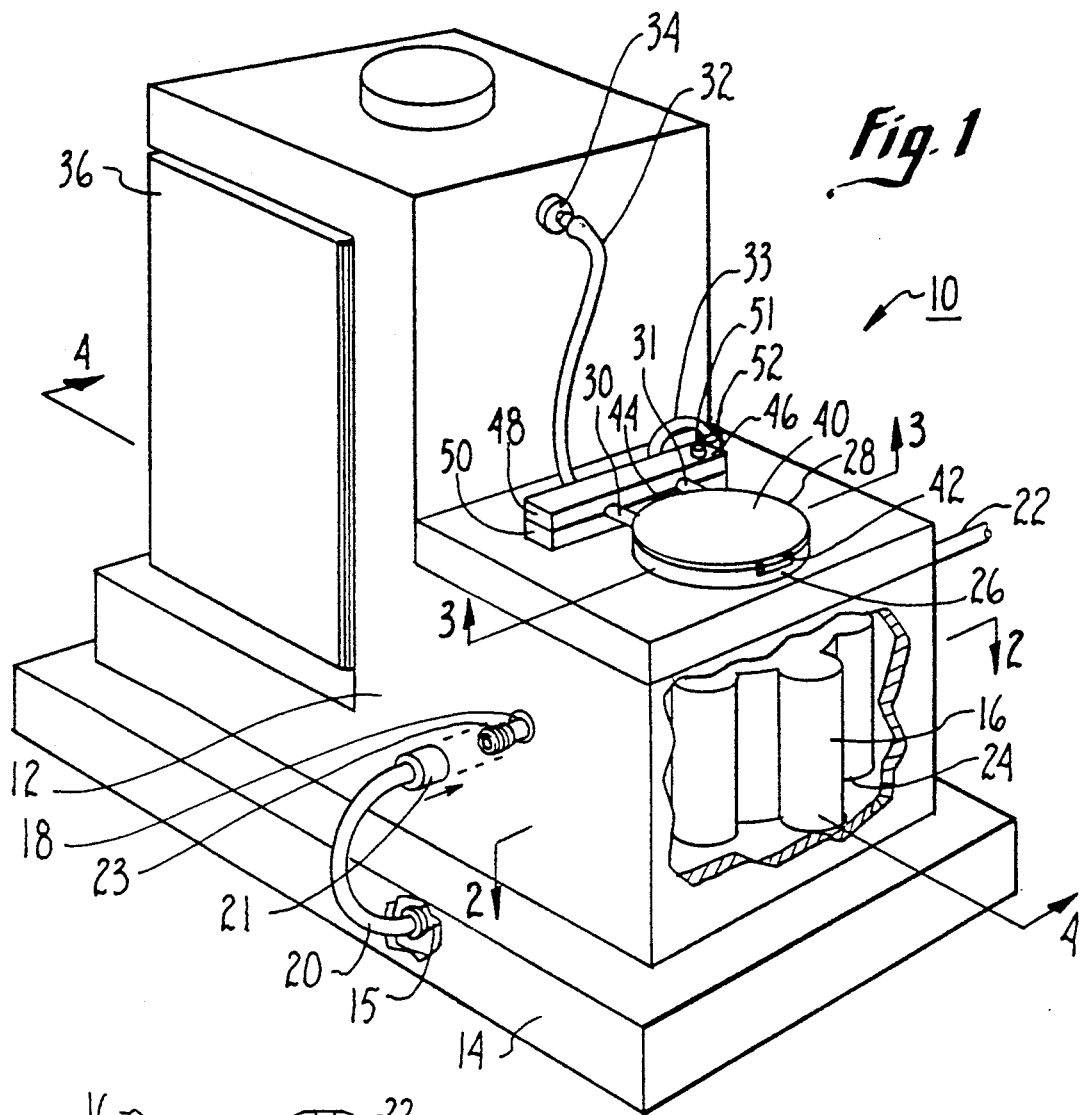
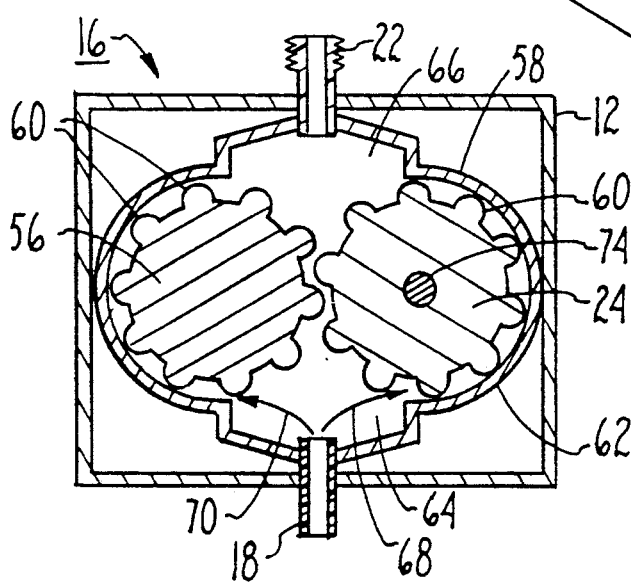

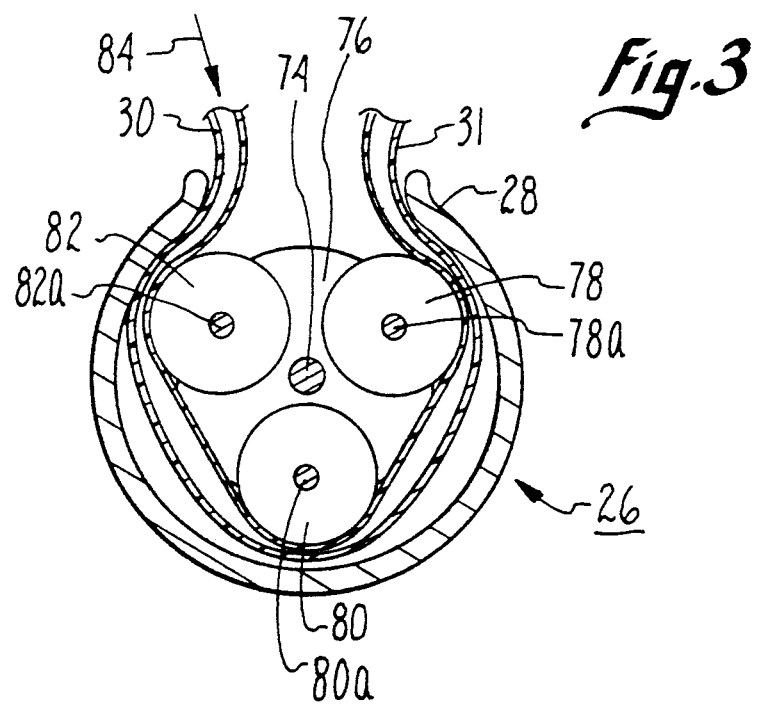

DOSING PUMP FOR BLENDING TWO LIQUIDS

FIELD OF THE INVENTION

The present invention relates generally to fluid dosing systems, and more particularly to systems for adding precise amounts of a fluid additive to a liquid stream.

BACKGROUND

In many fields of medicine, it is necessary to combine two fluids to produce a mixture. For example, it is sometimes necessary during intravenous (IV) therapy to infuse a plurality of liquid medicaments or nutrients into a patient's bloodstream. Mixing the liquids prior to infusion reduces the number of punctures which otherwise would be made in the patient's skin, thereby reducing patient discomfort.

Another instance in which it is desirable to mix two liquids is dental cleaning, during which pressurized water is directed against the patient's teeth to aid in cleaning the teeth. The cleansing water ordinarily impinges against the teeth, and a significant portion of the water then unavoidably splashes away from the teeth and can undesirably contact nearby equipment and the dental technician performing the cleaning. Accordingly, particularly in the era of AIDS, sterilizing the splashed water to reduce the possibility of contaminating medical personnel and equipment with grave diseases becomes a compelling goal. One way to sterilize the cleansing water is to mix it with a sterilization agent prior to directing the water against the patient's teeth.

It is to be appreciated that it is desirable to mix the sterilization agent with the cleansing water in a precise volumetric relationship. In other words, imprecisely injecting the agent into the cleansing water stream can be an inefficient and ineffective way to make the desired mixture. More particularly, injecting too much sterilization agent into the cleansing water can be unpleasant and potentially harmful to the patient, while injecting too little agent into the water can result in ineffective sterilization.

Further, in the case of the dental application discussed above, it is desirable that the mixing of the sterilization agent with the cleansing water be accomplished automatically and continuously as the water is sprayed against the teeth, to reduce the labor intensiveness of the procedure and to avoid encumbering the technician performing the procedure. Moreover, the sterilization agent preferably should be mixed with the cleansing water without requiring extensive modifications to existing dental equipment, and without requiring electrical power and its concomitant costs and potentially interfering power lines.

Accordingly, it is an object of the present invention to provide a dosing device for precisely mixing two liquids. It is another object of the present invention to provide a dosing device for automatically injecting a first liquid into a second liquid stream at an injection rate which is proportional to the mass flow rate of the second liquid. Another object of the present invention is to provide a dosing device that requires no electrical power to function. Yet another object of the present invention is to provide a dosing device which is easy to use and cost-effective to manufacture.

SUMMARY OF THE INVENTION

A device is provided for generating a mixture of a first fluid and a second fluid, wherein the second fluid constitutes a predetermined percentage of the mixture. In accordance with the present invention, the device includes a f low meter that has an inlet in fluid communication with the first fluid, an outlet, and first and second gears positioned between the inlet and outlet. As intended by the present invention, the gears are meshed together and counter-rotate relative to each other when the first fluid is directed through the inlet to the outlet. For each unit of first fluid that passes through the flow meter, the gears rotate a predetermined amount.

A shaft is connected to the first gear coaxially with the first gear, and the rotor of a rotary peristaltic pump is connected to the shaft. The peristaltic pump includes a platen, and the rotor is rotatably mounted adjacent the platen. A resilient tube is positioned between the rotor and the platen such that a predetermined amount of second fluid is urged through the tube for each increment of rotation of the rotor.

In accordance with present invention, the resilient tube has an inlet which is in fluid communication with the second fluid and an outlet which is in fluid communication with the outlet of the flow meter. Because the rotor of the peristaltic pump is connected, through the shaft, to the first gear of the flow meter, a predetermined amount of the second fluid is urged through the outlet of the peristaltic pump when a predetermined amount of the first fluid is directed through the inlet of the flow meter to the outlet of the flow meter.

Preferably, a container is provided for holding the second fluid, and the container is in fluid communication with the inlet of the tube. In one presently preferred embodiment, the first fluid is water and the second fluid includes a dental disinfectant agent.

In another aspect of the present invention, a dosing apparatus is provided for mixing first and second fluids in a predetermined volumetric relationship. The dosing apparatus includes a flow meter which has an inlet in fluid communication with the first fluid. Also, the flow meter has an outlet and at least one gear that rotates a predetermined amount when a predetermined amount of the first fluid is directed from the inlet to the outlet.

Further, the dosing apparatus includes a peristaltic pump that has an inlet in fluid communication with the second fluid and an outlet in fluid communication with the outlet of the flow meter. The peristaltic pump is coupled to the gear of the flow meter for urging a predetermined amount of the second fluid through the peristaltic pump to mix the predetermined amount of the second fluid with the predetermined amount of the first fluid to thereby establish the predetermined volumetric relationship.

In yet another aspect of the present invention, a mixing device includes a flow meter which has a rotation element for rotating a predetermined amount when a predetermined amount of a first fluid is directed past the element. Also, the metering device has a pump that is coupled to the rotation element of the flow meter for pumping a predetermined amount of a second fluid when the element rotates the predetermined amount.

In still another aspect of the present invention, a method is disclosed for establishing a mixture of a first fluid and a second fluid, wherein the first fluid constitutes a predetermined volumetric portion of the mixture. The method of the present invention includes the steps of providing a flow meter which has a rotatable gear in fluid communication with the first fluid, and providing a peristaltic pump that has a rotor and a resilient tube in fluid communication with the second fluid. The rotor of the peristaltic pump is coupled to the gear of the flow meter.

Then, the first fluid is directed past the gear to cause the gear to rotate a predetermined amount for each unit of first fluid that is directed past the gear. This in turn causes the rotor of the peristaltic pump to rotate to pump a predetermined amount of the second fluid. Consequently, the fluids that have been directed through the pumps are mixed together in a predetermined volumetric relationship.

The details of the present invention, both as to its construction and operation, can best be understood in reference to the accompanying drawings, in which like numerals refer to like parts, and in which:

BRIEF DESCRIPTION OF THE DRAWINGS

FIG. 1 is a perspective view of the liquid dosing apparatus of the present invention, with portions broken away for clarity;

FIG. 2 is a cross-sectional view of the liquid dosing apparatus of the present invention, as seen along the line 2—2 in FIG. 1;

FIG. 3 is a cross-sectional view of the liquid dosing apparatus of the present invention, as seen along the line 3—3 in FIG. 1;

DETAILED DESCRIPTION OF THE PREFERRED EMBODIMENT

Figure 4:
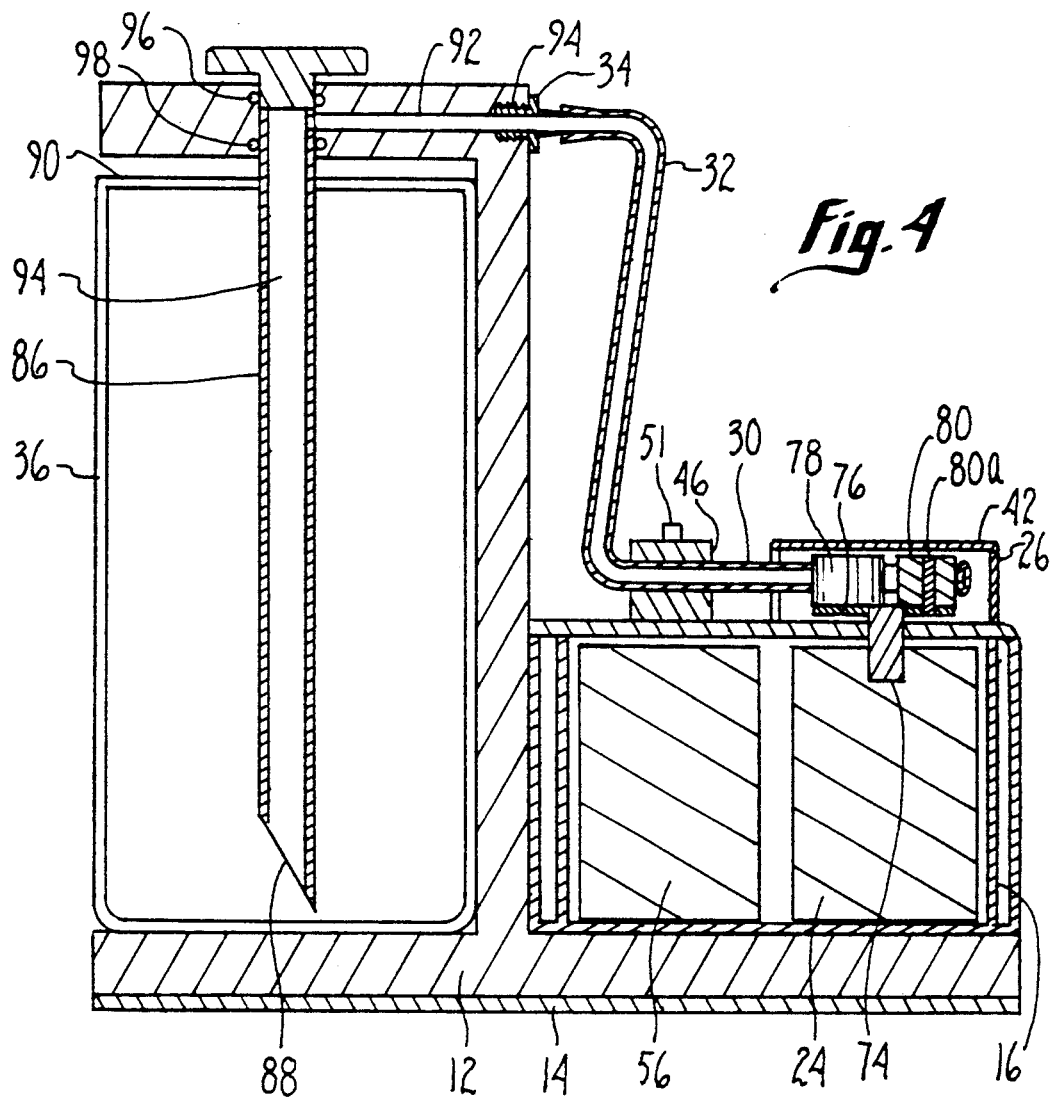
FIG. 4 is a cross-sectional view of the liquid dosing apparatus of the present invention, as seen along the line 4—4 in FIG. 1.

Referring initially to FIG. 1, a dosing apparatus is shown, generally designated 10. As shown, the apparatus 10 includes a housing 12 which is preferably mounted on or otherwise attached to a base 14. The base 14 encloses a public water supply fitting 15.

FIG. 1 shows that the dosing apparatus 10 includes a flow meter 16 which has a fluid inlet port 18. As intended by the present invention, flow meter broadly means a device which has at least one movable element, and the movable element can be moved when fluid is directed through the device. In the specific embodiment contemplated herein, the flow meter 16 is a gear-type flow meter, as more fully disclosed below.

The fluid inlet port 18 of the flow meter 16 is connected to a tube 20. More specifically, in one presently preferred embodiment the tube 20 includes an annular threaded connector 21 which can rotate relative to the tube 20, and the connector 21 can be engaged with threads 23 that are formed on the inlet port 18. In turn, the tube 20 is in fluid communication with the public water supply, or other source of fluid. It is to be understood that the tube 20 can be connected to the public water supply by any suitable means known in the art, e.g., by connecting the tube 2 0 to a fitting or nozzle that is in turn in fluid communication with the public water supply.

Further, the flow meter 16 has a fluid outlet port 22. Pressurized fluid from the public water supply can enter the inlet port 18 and flow through the flow meter 16 and out of the outlet port 22. In one presently preferred embodiment, a dental spray console such as the type Bobcat console made by Dentsply Inc. is connected to the outlet port 22 by means well-known in the art, e.g., by snappingly engaging the outlet port 22 with the console.

In accordance with the present invention, the flow meter 16 includes a rotation element which, in the embodiment shown in FIG. 1, is a gear 24 that rotates when the pressurized fluid from the fitting 15 passes from the inlet 18 port to the outlet port 22. As shown in FIG. 1, a rotary peristaltic pump 26 is positioned above the flow meter 16. The peristaltic pump 26 includes an arcuate platen 28, and a plurality of resilient peristaltic pump tubes that are made of silicon rubber or other suitable resilient material.

Specifically, the pump 26 includes an inlet segment 30, an inlet connector segment 32, an outlet segment 31, and an outlet connector segment 33. The inlet connector segment 32 is connected by means well-known in the art, e.g., by a surrounding interference fit, to a hollow fitting 34, and the fitting 34 in turn is in fluid communication with a container 36 of fluid, e.g., a fluid which contains a dental sterilization agent or disinfectant. Also, the inlet segment 30 is in fluid communication with the inlet connector segment 32, and the outlet segment 31 is in fluid communication with the outlet connector segment 33, as more fully disclosed below. It is to be understood that the outlet connector segment 33 of the resilient tube 30 is in fluid communication with the outlet port 22 of the flow meter 16.

Further, the peristaltic pump 26 has a top plate 40 that is hingedly connected to the arcuate platen 28 at a hinge 42. The top plate 40 has an open position, wherein the plate 40 is distanced from the platen 28 so that the tube 30 can be positioned within the pump 26, and a closed position, wherein the plate 40 is juxtaposed with the platen 28 so that a fluid-tight seal is established between the platen 28 and top plate 40. The top plate 40 can be held in the closed position by means well-known in the art, e.g., by clipping or otherwise fastening a free end 44 of the plate 40 to the platen 28.

FIG. 1 also shows that the inlet segments 30, 32 are held together by a clamp 46, and the outlet segments 31, 33 are also held together by the clamp 46. More specifically, the clamp 46 has an upper block 48 and a lower block 50, and a portion of each segment 30, 32, 31, 33 is held between the upper and lower blocks 48, 50 of the clamp 46. The upper block 48 is hingedly connected to the lower block 50, to permit pivoting the upper block 48 away from the lower block 50 for positioning the segments 30, 32, 31, 33 in the clamp 46.

When the tube segments 30, 32, 31, 33 are properly positioned, the upper block 48 is pivoted against the lower block 50 to hold the tube segments 30, 32, 31, 33 stationary. A thumb screw 51 is rotatably engaged with the upper block 50 and can be manipulated to threadably engage the lower block 48, to hold the upper block 50 against the lower block 48. As will be more fully disclosed below, sufficient clearance exists between the blocks 48, 50 of the clamp 46 to permit fluid flow through the tubes 30, 32, 31, 33 when they are held within the clamp 46.

Additionally, FIG. 1 shows that the outlet segment 33 is connected to a hollow fitting 52, and the fitting 52 is in turn mounted on the housing 12. An IV tube connector (not shown) is connected to the fitting 52, and the connector is in turn connected to the flow meter 16.

Now referring to FIG. 2, the details of the flow meter 16 can be seen. Preferably, the flow meter 16 is a type AP-1 meter made by Flowdata Inc. As shown in FIG. 2, the flow meter 16 includes a first gear 24 and a second gear 56. Each gear 24, 56 is rotatably mounted on a housing 58 of the flow meter 16, and each includes a plurality of teeth 60. In accordance with the present invention, the first gear 24 rotates in a direction opposite the direction of rotation of the second gear 56, and the gears 24, 56 are meshed together.

FIG. 2 also shows that the flow meter 16 has a flow director 62, and the flow director 62 establishes a fluid inlet plenum 64 and a fluid outlet plenum 66. The connector mentioned above which is attached to the fitting 52 (FIG. 1) is in fluid communication with the outlet plenum 66 of the flow meter 16. Also, as shown in FIG. 2, the inlet port 18 is in fluid communication with the inlet plenum 64, and the outlet port 22 is in fluid communication with the outlet plenum 66.

In accordance with the principles of operation of the flow meter 16 described above, fluid can be ported into the inlet plenum 64 to urge the gears 24, 56 to rotate counter to each other. Because the gears 24, 56 are meshed, fluid cannot pass between the gears 24, 56. Instead, fluid must pass around the gears 24, 56 as indicated by the arrows 68, 70, and flow out of the outlet plenum 66. Accordingly, for each increment of rotation the gears 24, 56, a precisely known amount of fluid passes from the inlet plenum 64 to the outlet plenum 66. Stated differently, for each unit volume of fluid which passes through the flow meter 16, each gear 24, 56 rotates a predetermined amount.

FIG. 2 further shows that a rigid cylindrical metal or hard plastic drive shaft 74 is connected to the gear 24 coaxially with the gear 24. This drive shaft 74 is in turn coupled to the peristaltic pump 26, as described below.

Now referring to FIGS. 3 and 4, the details of the rotary peristaltic pump 26 can be seen. As best shown in FIG. 3, the pump 26 includes a cylindrical rotor 76, and three identical discshaped rollers 78, 80, 82 which are rotatably mounted on the rotor 76 by means of respective pin bearings 78a, 80a, 82a. Also, the drive shaft 74 is fixedly connected to the rotor 76 and is coaxial with the rotor 76. Furthermore, FIG. 3 shows that the inlet segment 30 is integral with the outlet segment 31, and that the segments 30, 31 are positioned between the rollers 78, 80, 82 and the rigid arcuate platen 28.

In accordance with the principles of operation of rotary peristaltic pumps, the rotor 76 can be rotated to cause the rollers 78, 80, 82 to roll along the tube segments 30, 31 and squeeze the segments 30, 31 against the platen 28. This rolling action in turn urges fluid from the container 36 (FIG. 1) through the tubes 30, 31 in the direction indicated by the arrow 84. As the skilled artisan will appreciate, a predetermined amount of fluid is urged through the segments 30, 31 for each increment of rotation of the rotor 76.

It will be understood that because the rotor 76 is coupled to the gear 24 through the drive shaft 74, rotation of the gear 24 causes rotation of the rotor 76. Recall that each unit volume of fluid from the fitting 15 which is directed through the flow meter 16 causes a precisely predetermined increment of rotation of the gear 24, and that a precisely predetermined amount of fluid from the container 36 is pumped through the peristaltic pump 26, for each increment of rotation of the rotor 76. Consequently, for each unit volume of fluid from the fitting 15 which is directed through the flow meter 16, a precisely predetermined amount of fluid from the container 36 is pumped by the peristaltic pump 26 into the outlet plenum 66 of the flow meter 16 (FIG. 2) to be mixed with the fluid from the fitting 15.

In accordance with the disclosure above, it will be appreciated that fluid from the fitting 15 can be mixed with fluid from the container 36 at a precise predetermined ratio, i.e., in a precise predetermined volumetric relationship. To establish a particular ratio between the two fluids, the components of the flow meter 16 and the peristaltic pump 26 discussed above are dimensioned as appropriate for the desired ratio.

Figure 5:
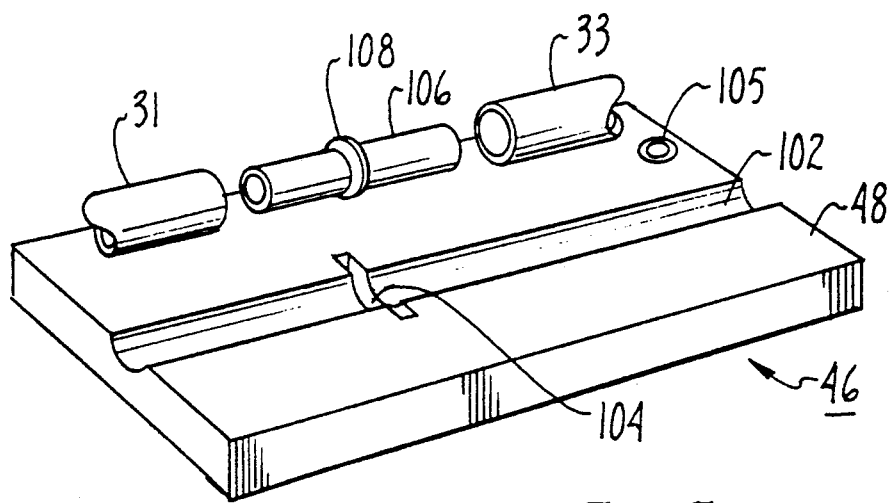
FIG. 5 is an exploded perspective view of the bottom block of the clamp, and the stent and tube segments, with portions broken away for clarity.

FIGS. 4 and 5 show further details of the dosing apparatus 10. More particularly, FIG. 4 shows that the container 36 is positioned on the base 12, and an elongated hollow rigid dipstick 86 is disposed partially within the container 36. Stated differently, the dipstick 86 has a pointed end 88, and the pointed end 88 can be advanced through an upper surface 90 of the container 36 to puncture the upper surface 90. A passageway 92 is formed in the base 12, and the passageway 92 is in fluid communication with a lumen 94 of the dipstick 86. Also, the passageway 92 is in fluid communication with the fitting 34. As shown, the fitting 34 has a threaded portion 94 that is threadably engaged with the base 12.

FIG. 4 also shows that two resilient o-rings 96, 98 are positioned between the dipstick 86 and the base 12, to establish a fluid seal therebetween.

Accordingly, the container 36 can be positioned on the base 12 as shown, and the dipstick 86 advanced into the container 36 to establish a pathway for fluid communication from the container 36, through the dipstick 86, passageway 92, fitting 34, and inlet connector segment 32.

Now referring to FIG. 5, the means by which the outlet segment 31 is placed in fluid communication with the outlet connector segment 33 is shown. It is to be understood that the inlet segments 30, 32 can be connected in an analogous manner.

As shown in FIG. 5, an elongated semicylindrical channel 102 is formed in the lower block 48 of the clamp 46. This channel includes a semicylindrical groove 104 that is formed in the lower block 48 transversely to the channel 102. It is to be understood that the upper block 50 (FIG. 1) is formed with a complementary groove and channel which face the groove 104 and channel 102 of the lower block 48 when the upper block 50 is held against the lower block 48. Also, the lower block 48 has a threaded receptacle 105 for receiving the thumb screw 51 to thereby hold the upper block 50 against the lower block 48.

A hollow rigid stent 106 having a toroidal-shaped collar 108 is receivable in the channel 102, with the collar being receivable in the groove 104. The outlet segment 31 and outlet connector segment 33 are connected to the stent 106 by sliding the segments 31, 33 onto the stent 106 in an interference fit therewith.

Accordingly, it will be appreciated that the upper block 50 can be pivoted against the lower block 48, and the thumb screw 51 tightened to tightly hold the outlet segments 31, 33 against the stent 106 and within the clamp 46. Consequently, the outlet segments 31, 33 will remain securely connected in fluid communication in the presence of the relatively high outlet pressures that may be generated by the peristaltic pump 26.

While the particular dosing apparatus as herein shown and described in detail is fully capable of attaining the abovedescribed objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A device for generating a mixture of a first fluid and a second fluid, wherein the second fluid constitutes a predetermined percentage of the mixture, the device comprising:
    a flow meter having an inlet in fluid communication with the first fluid, an outlet, and first and second gears positioned between the inlet and outlet, wherein the gears are meshed together for rotating when the first fluid is directed through the inlet to the outlet;
    a shaft connected to the first gear; and
    a peristaltic pump including a platen, a rotor rotatably mounted adjacent the platen, and a resilient tube positioned between the rotor and the platen such that fluid is urged through the tube when the rotor rotates, the resilient tube having an inlet in fluid communication with the second fluid and an outlet in fluid communication with the outlet of the flow meter, wherein the rotor is connected to the shaft such that a predetermined amount of the second fluid is urged through the outlet of the peristaltic pump when a predetermined amount of the first fluid is directed through the inlet of the flow meter to the outlet of the flow meter.

2. The device of claim 1, further comprising a container for holding the second fluid, the container being in fluid communication with the inlet of the tube.

3. The device of claim 2, wherein the first fluid is water and the second fluid includes a disinfectant agent.

4. The device of claim 3, wherein the disinfectant agent is a dental disinfectant agent.

5. A dosing apparatus for mixing first and second fluids in a predetermined volumetric relationship, comprising:
    a flow meter having an inlet in fluid communication with the first fluid, the flow meter also having an outlet and at least one gear that rotates a predetermined amount when a predetermined amount of the first fluid is directed from the inlet to the outlet; and
    a peristaltic pump having an inlet in fluid communication with the second fluid and an outlet in fluid communication with the outlet of the flow meter, wherein the peristaltic pump is coupled to the gear of the flow meter for urging a predetermined amount of the second fluid through the peristaltic pump to mix the predetermined amount of the second fluid with the predetermined amount of the first fluid to thereby establish the predetermined volumetric relationship.

6. The dosing apparatus of claim 5, wherein the flow meter includes first and second gears positioned between the inlet and outlet, wherein the gears are meshed together for rotating a predetermined amount when the first fluid is directed through the inlet to the outlet.

7. The dosing apparatus of claim 6, further comprising a shaft connected to the first gear of the flow meter, wherein the peristaltic pump includes:
    a platen;
    a rotor rotatably mounted adjacent the platen; and
    a resilient tube positioned between the rotor and the platen such that the second fluid is urged through the tube when the rotor rotates, the resilient tube having an inlet in fluid communication with the second fluid and an outlet in fluid communication with the outlet of the flow meter, wherein the rotor is connected to the shaft such that a predetermined amount of the second fluid is urged through the outlet of the peristaltic pump when a predetermined amount of the first fluid is directed through the inlet of the flow meter to the outlet of the flow meter.

8. The dosing apparatus of claim 7, further comprising a container for holding the second fluid, the container being in fluid communication with the inlet of the resilient tube.

9. The dosing apparatus of claim 8, wherein the first fluid is water and the second fluid includes a disinfectant agent.

10. The dosing apparatus of claim 9, wherein the disinfectant agent is a dental disinfectant agent.

11. A mixing device, comprising:
    a flow meter having a rotation element for rotating a predetermined amount when a predetermined amount of a first fluid is directed past the element; and
    a pump having a single drive shaft coupled to the rotation element of the flow meter for pumping a predetermined amount of a second fluid when the element rotates the predetermined amount.

12. The mixing device of claim 11, wherein the flow meter is a gear flow meter, the rotation element is a gear, and the pump is a peristaltic pump.

13. The mixing device of claim 12, wherein the peristaltic pump is a rotary peristaltic pump.

14. The mixing device of claim 13, wherein the flow meter includes an inlet, an outlet, and first and second gears positioned between the inlet and outlet, wherein the gears are meshed together for rotating a predetermined amount when the first fluid is directed through the inlet to the outlet.

15. The dosing apparatus of claim 14, further comprising a shaft connected to the first gear of the flow meter, wherein the peristaltic pump includes:
    a platen;
    a rotor rotatably mounted adjacent the platen; and
    a resilient tube positioned between the rotor and the platen such that the second fluid is urged through the tube when the rotor rotates, the resilient tube having an inlet in fluid communication with the second f fluid and an outlet in fluid communication with the outlet of the flow meter, wherein the rotor is connected to the shaft such that a predetermined amount of the second fluid is urged through the outlet of the peristaltic pump when a predetermined amount of the first fluid is directed through the inlet of the flow meter to the outlet of the flow meter.

16. The dosing apparatus of claim 15, further comprising a container for holding the second fluid, the container being in fluid communication with the inlet of the resilient tube.

17. The dosing apparatus of claim 16, further comprising:
    an outlet connector tube in fluid communication with the outlet of the flow meter;
    a clamp having upper and lower blocks, the blocks being formed with opposing channels; and
    a hollow rigid stent having first and second ends positioned in the channels between the blocks, wherein the outlet of the resilient tube is connected to the first end of the stent and the outlet connector tube is connected to the second end of the stent.

18. A method for establishing a mixture of a first fluid and a second fluid, wherein the first fluid constitutes a predetermined volumetric portion of the mixture, the method comprising:
 (a) providing a flow meter having a rotatable gear in fluid communication with the first fluid;
 (b) providing a peristaltic pump having a rotor and a resilient tube in fluid communication with the second fluid;
 (c) coupling the rotor of the peristaltic pump to the gear of the flow meter;
 (d) directing the first fluid past the gear to cause the gear to rotate a predetermined amount for each unit of first fluid that is directed past the gear to thereby cause the rotor of the peristaltic pump to rotate to pump a predetermined amount of the second fluid; and
 (e) mixing the fluids that have been directed through the pumps.

* * * * *